United States Patent
Rodden et al.

(10) Patent No.: US 6,695,251 B2
(45) Date of Patent: Feb. 24, 2004

(54) METHOD AND SYSTEM FOR SYNCHRONIZED FORWARD AND AFT THRUST VECTOR CONTROL

(75) Inventors: John J. Rodden, Los Altos, CA (US); Andrew E. Turner, Mountain View, CA (US)

(73) Assignee: Space Systems/Loral, Inc, Palo Alto, CA (US)

(*) Notice: Subject to any disclaimer, the term of this patent is extended or adjusted under 35 U.S.C. 154(b) by 0 days.

(21) Appl. No.: 09/883,622

(22) Filed: Jun. 19, 2001

(65) Prior Publication Data

US 2003/0042355 A1 Mar. 6, 2003

(51) Int. Cl.⁷ .............. F42B 10/02; F42B 15/01
(52) U.S. Cl. .............. 244/3.21; 244/3.1; 244/3.15; 244/164; 244/169
(58) Field of Search .............. 244/3.1, 3.15, 244/3.21, 3.22, 3.23, 169, 3.11, 3.12–3.16, 164–168, 170, 171

(56) References Cited

U.S. PATENT DOCUMENTS

| | | | |
|---|---|---|---|
| 2,922,602 A | | 1/1960 | Matheisel et al. .............. 244/63 |
| 3,018,981 A | * | 1/1962 | Weller .............. 244/3.14 |
| 4,408,735 A | * | 10/1983 | Metz .............. 244/3.16 |
| 4,928,906 A | * | 5/1990 | Sturm .............. 244/3.22 |
| 5,028,014 A | | 7/1991 | Anderson, Jr. .............. 244/3.22 |
| 5,054,712 A | * | 10/1991 | Bar et al. .............. 244/3.22 |
| 5,062,593 A | * | 11/1991 | Goddard et al. .............. 244/169 |
| 5,456,429 A | * | 10/1995 | Mayersak .............. 244/169 |
| 5,631,830 A | * | 5/1997 | Schroeder .............. 244/3.21 |
| 5,657,948 A | * | 8/1997 | Roucoux .............. 244/3.22 |
| RE37,331 E | * | 8/2001 | Schroeder .............. 244/3.21 |
| 6,347,763 B1 | * | 2/2002 | Harkins et al. .............. 244/3.15 |

* cited by examiner

Primary Examiner—Bernarr E. Gregory
(74) Attorney, Agent, or Firm—Perman & Green, LLP

(57) ABSTRACT

A system for controlling attitude about pitch, yaw, and roll axes and axial thrust of a body. The system comprises a main thrust generator located on an aft portion of the body and at least one reaction control system (RCS) located on a forward portion of the body. A thrust vector controller (TVC) is connectable to the main thrust generator and at least one RCS controller is connectable to the RCS. The RCS controller and the TVC are synchronized to adjust the direction of the principal line of thrust through the body center of gravity.

33 Claims, 6 Drawing Sheets

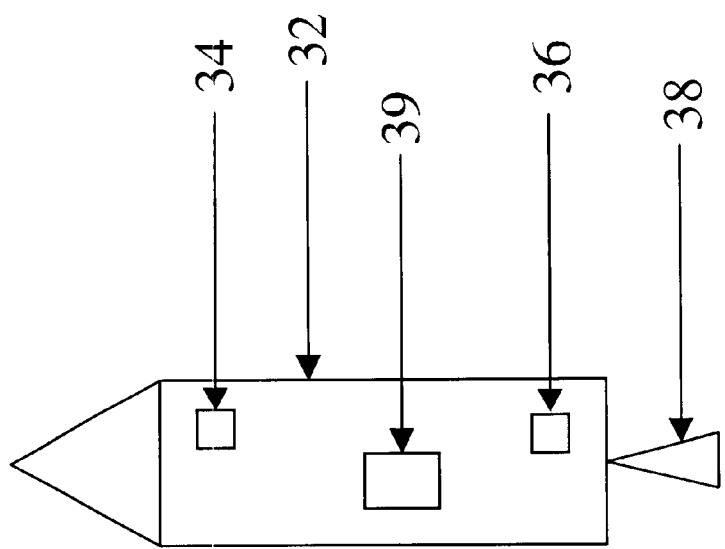

METHOD AND SYSTEM FOR SYNCHRONIZED FORWARD AND AFT THRUST VECTOR CONTROL

BACKGROUND OF THE INVENTION

1. Field of the Invention

The present invention relates generally to thrust vector control systems and, more particularly, to synchronized forward and aft thrust vector control.

2. Prior Art

Referring to FIG. 1, thruster positioning mechanisms and systems are used on spacecraft 1 or similar bodies for the purpose of directing the propulsive force from a thruster. Such systems are often used to align the thrust vector 5 reaction through the center of mass 3 of the spacecraft 1 to enable straight line acceleration. Vectoring of the thrust away from the center of mass 3 is often done to initiate vehicle rotation or for course changing maneuvers. Such thrust vectoring is used to control the pitch and yaw rate of the spacecraft 1.

In zero-length launch of aircraft, the jet engine is used with a rocket motor to accelerate the aircraft to flying speed in a brief interval of time. In early designs of such aircraft, such as described in the patent to Mathiesel et al, U.S. Pat. No. 2,922,602, the rocket motor was positioned to direct its thrust through the center of gravity of the aircraft.

In later designs, wherein the jet engine is displaced from the longitudinal axis of the aircraft, the rocket motor is positioned to balance the respective aerodynamic, engine thrust and motor thrust moments around the aircraft center of gravity. A major problem of this later design encountered during zero launch is the control of the aircraft pitching moments which are dependent upon: the magnitudes and variations of engine and rocket motor thrust; the variations in the center of gravity during the boost phase; the variations in the aircraft aerodynamics; and the engine exhaust impingement on the rocket motor assembly.

It has been suggested in the prior art that a thrust vector control system (TVCS) be used with a control device in the rocket exhaust nozzle or aft of the rocket exhaust nozzle. Since the rocket motor is normally jettisoned after launch, such a control system would be jettisoned with the boost motor, thus increasing launch costs.

In addition, such conventional TVCSs located in the rocket exhaust nozzle require rapid response performance capability. Which, when coupled with a very high reliability requirement necessitates the need for a very complex and expensive TVCS.

SUMMARY OF THE INVENTION

In accordance with one embodiment of the invention a system for controlling attitude about pitch, yaw, and roll axes and axial thrust of a body is provided. The system comprises a main thrust generator located on an aft portion of the body. The aft portion of the body being aft of a calculated dynamic center of gravity of the body. A thrust vector controller (TVC) is connectable to the main thrust generator. The system also comprises at least one fast reaction control system (RCS), located on a forward portion of the body. The forward portion of the body being forward of the calculated dynamic center of gravity of the body. An RCS controller is connectable to, and synchronized with the RCS and the TVC.

In accordance with another embodiment the invention is directed towards an attitude control system for controlling momentum vector force about a center of gravity of a rocket. The system comprises a main propulsion nozzle having a main propulsion axis wherein the main propulsion nozzle is disposed aft of the center of gravity. The main propulsion nozzle is steered by a main propulsion controller. The system also comprises a forward located reaction control system having a plurality of selectively and independently controlled radial force generating nozzles. The plurality of radial force generating nozzles are synchronized to work in conjunction with at least one controllable aerodynamic vane and the main propulsion controller.

In accordance with another embodiment of the invention a rocket controller is provided. The rocket controller is disposed within a rocket having forward and aft sections, a central axis, and a dynamic center of gravity. The rocket controller comprises a principal thrust generator located aft of the rocket dynamic center of gravity and a thrust vector controller. The thrust vector controller is adapted to control the thrust generator. The rocket controller also comprises a second thrust generator located forward of the rocket dynamic center of gravity, and a second thrust vector controller. The second thrust vector controller is adapted to control the second thrust generator.

In accordance with another embodiment the invention includes a method for synchronizing forward and aft thrust vector control for a body traveling in a fluid. The body is adapted to minimizing fluid resistance and having forward and aft sections; and has a primary thrust generator disposed in the aft section, and a secondary thrust generator disposed in the forward section. The method comprises the steps of initiating the primary thrust generator and calculating a dynamic center of gravity for the traveling body. Next, the principal thrust axis generated by the primary thrust generator is calculated and compared with the calculated center of gravity to determine an offset between the principal thrust axis and the dynamic center of gravity. If the offset exceeds a predetermined value then the offset is adjusted to the predetermined value or lower by synchronized operation of the primary and secondary thrust generators.

The invention is also directed towards a program storage device readable by a machine, tangibly embodying a program of instructions executable by the machine to perform method steps for synchronizing forward and aft thrust vector control for a body traveling in a fluid. The body is adapted to minimizing fluid resistance and having forward and aft sections, a primary thrust generator disposed in the aft section, and a secondary thrust generator disposed in the forward section. The method comprises the step of initiating the primary thrust generator and calculating a dynamic center of gravity for the traveling body. The next step calculates a principal thrust axis generated by the primary thrust generator and determines an offset between the principal thrust axis and the dynamic center of gravity. If the offset exceeds a predetermined value the next step adjusts the offset to the predetermined value, or lower. The step of adjusting the offset further comprises the step of calculating a torque required to adjust the offset to the predetermined value and initiating the secondary thrust generator to apply the calculated torque. In addition, the primary thrust generator is steered to assist in adjusting the offset to the predetermined value.

BRIEF DESCRIPTION OF THE DRAWINGS

The foregoing aspects and other features of the present invention are explained in the following description, taken in connection with the accompanying drawings, wherein:

FIG. 3 is a pictorial view of a body incorporating features of the present invention;

DETAILED DESCRIPTION OF THE PREFERRED EMBODIMENT

Figure 1:
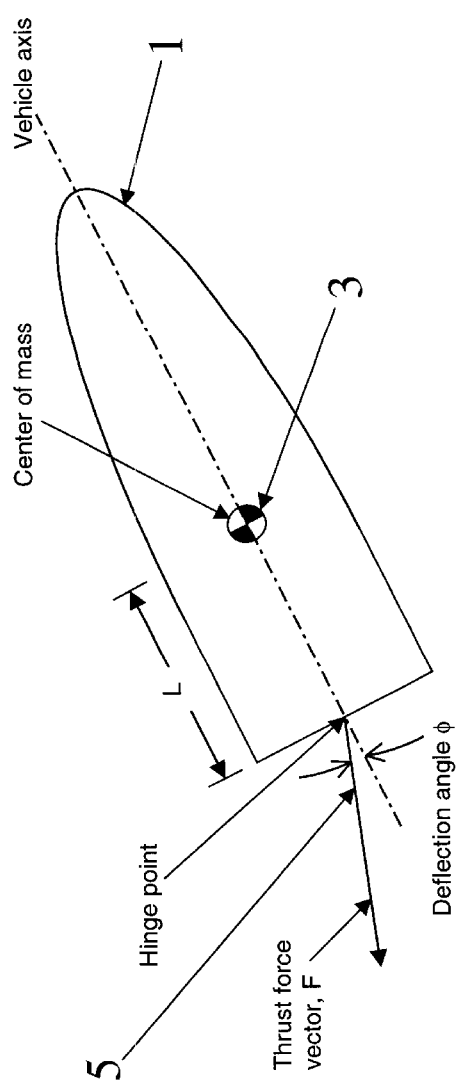
FIG. 1 is a pictorial view of a body in a fluid, illustrating relationships between a moveable thrust force vector, center of mass, and vehicle axis.

Referring to FIG. 3, there is shown an perspective view of a rocket body 32 incorporating features of the present invention. Although the present invention will be described with reference to an embodiment in a rocket as shown in the drawings, it should be understood that the present invention can be embodied in many alternate forms of embodiments, and it is not intended that this invention is limited only to that particular type of embodiment. In an alternate embodiment the present invention could also be used in any suitable type of body in a fluid where thrust vector control is required; such as, for example, torpedoes or submarines.

With general regard to rocket propulsion, reference can be had to "Rocket Propulsion Elements", by George P. Sutton, 6$^{th}$ ed., 1992, the disclosure of which is incorporated by reference in its entirety.

Referring now to FIG. 3 there is shown a pictorial view of a body 32 incorporating features of the present invention. A reaction control system (RCS) 34 is operated synchronously with a main thrust vector control system 36 to correct a thrust vector TV generated by a main propulsor 38. The combined RCS 34 and TVC 36 subsystems can be made to have a lower complexity and cost than a single RCS or a single TVC subsystem that performs singly and independently. The subsystems complement their respective performances in term of response capability, eliminating the need for either to have a wide dynamic range. The RCS thrusters and propellant storage are located in the forward section and respond to autopilot signals with a relatively fast band pass to control short-term dynamic disturbances. The complementary TVC is a relatively simple positioning device for repositioning the engine thrust vector. The TVC eliminates the principal rocket attitude disturbance, which is offset of the thrust vector and the vehicle center of gravity (CG) 39. This disturbance is the largest in the vehicle system and moves slowly as the main propulsion propellant is depleted. CG offset is uncertain at liftoff and is determined only after the vehicle is in powered flight. The TVC 36 can be a relatively simple positioning device, possibly electro-mechanical or hydraulic, with high mechanical advantage, since relatively slow dynamical motions are to be controlled by it. Rapid dynamical motions are controlled by the RCS 34, which stabilizes the vehicle until the TVC 36 has had sufficient time to align the thrust vector and the CG 39.

Figure 5:
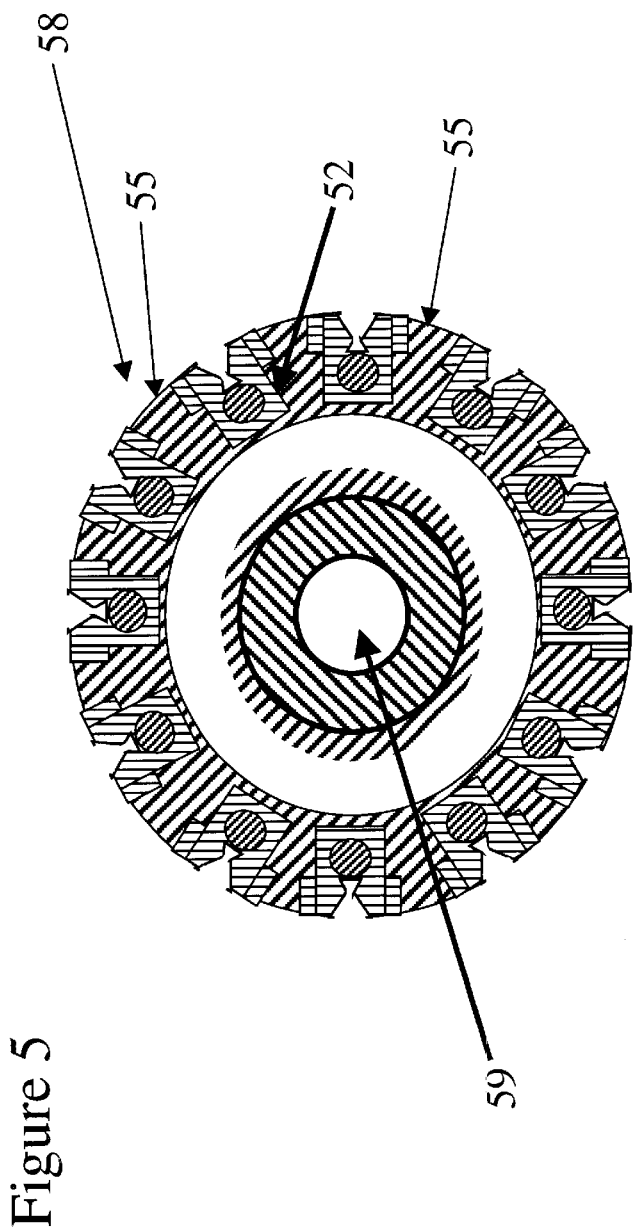
FIG. 5 is a cross-sectional view of a rocket body showing distribution of thrusters arranged radially around the rocket body.
Figure 6:
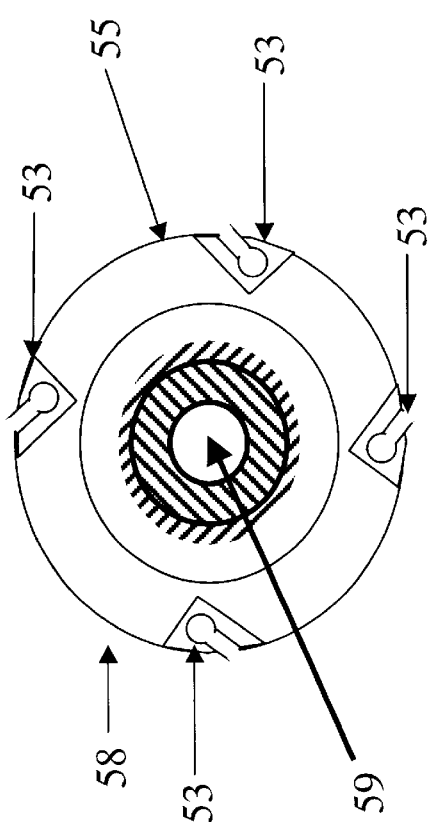
FIG. 6 is a cross-sectional view of a rocket body showing thrusters arranged tangentially to the rocket body.

Still referring to FIG. 3 and now FIGS. 5 and 6, the RCS 34 may consist of any suitable thrust generator system. For example the RCS may comprise at least three radial thrusters FIG. 5 item 52 or at least two tangential thrusters FIG. 6 items 53 comprising mass expulsion devices, arranged in a pattern around the forward section of the body 58. The radial thrusters 52 are arranged to selectively produce a radial thrust vector, where the vector sum of the radial thrust vectors is perpendicular to the axial thrust generated by the main propulsor 38. The tangential thrusters 53 produce thrust in opposing directions to control rotation of the vehicle around its long axis 59. In an alternate embodiment the RCS system may comprise a combination of radial and tangential thrusters.

The main thrust vector generated by the main propulsor 38 is gimbaled, and has a thrust vector controller (TVC), so that its line of action can be steered through the CG 39 to minimize disturbance torque TD. The slower TVC 36 also operates in synchronicity with the faster RCS in order to steer the main thrust vector through the body's center of gravity CG 39.

Figure 2A:
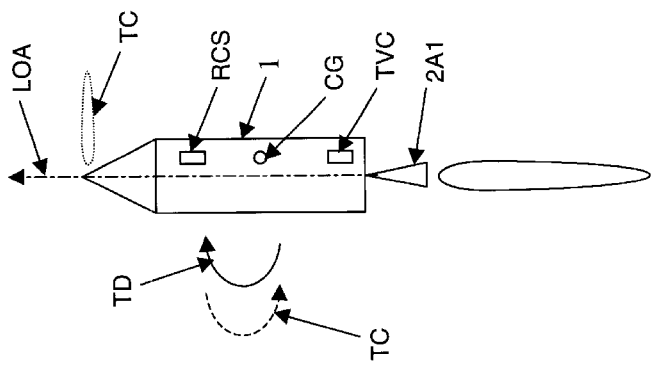
FIGS. 2A–2C show a series of pictorial views of a body in a fluid illustrating one embodiment of this invention.
Figure 2C:
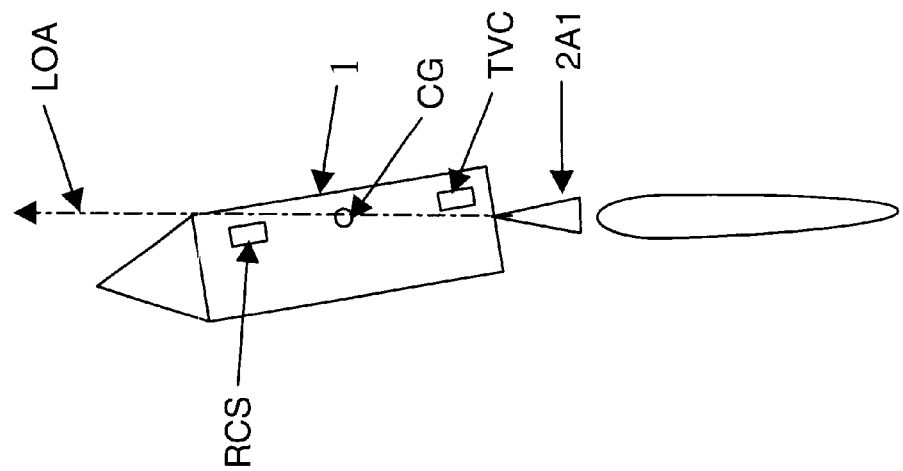
Figure 2B:
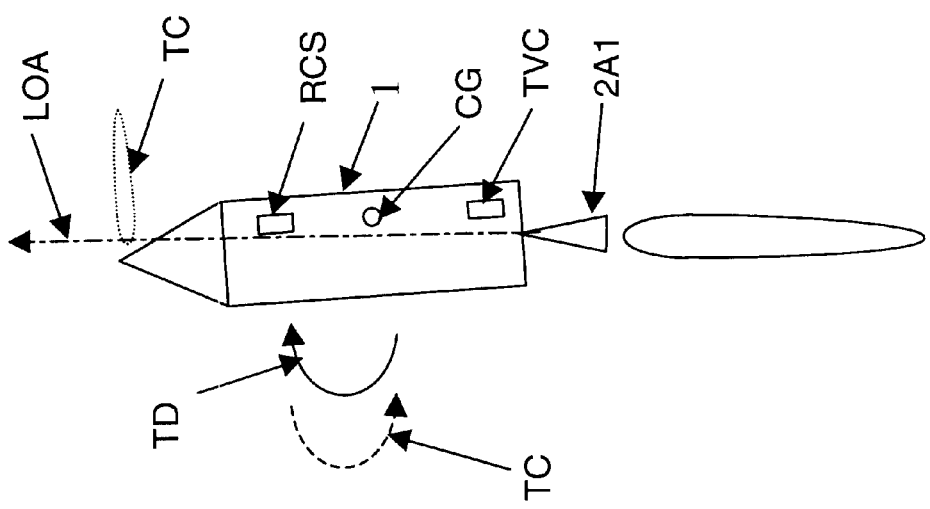
Figure 2A:
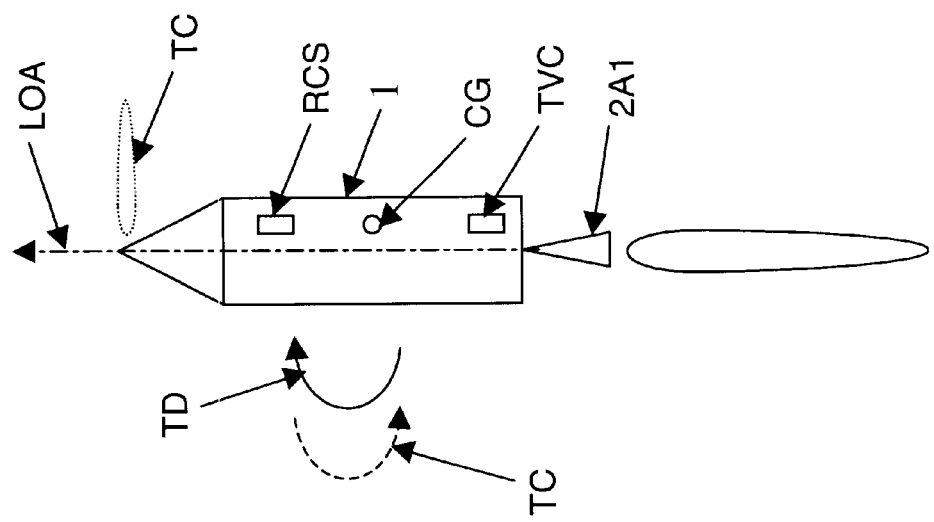

This may be illustrated by referring also to FIG. 2A where the initial line of action LOA of the engine 2A1 thrust is shown not to pass through the center of gravity CG of the launch vehicle 1; resulting in a disturbance torque TD. Referring also to FIG. 2B, the disturbance torque TD is initially corrected by the reaction control system RCS generating a corrective torque TC to counteract the disturbance torque TD. The control torque TC generated by the fast acting RCS thruster prevents the vehicle from rotating under the influence of TD while the slower thrust vector controller TVC gimbals the engine 2A1 to align the thrust line of action LOA through the center of gravity CG as shown in FIG. 2C. The RCS is operated over very short time scales to generate torques of high magnitude, thus providing fast control with respect to the slower main thrust vector controller.

The TVC is designed to steer the direction of thrust at a rate slower than typical thrust vector control systems, thus enabling the gimballing system to be built for a lower cost. Over a predetermined time frame the disturbance torque TD is reduced to an acceptable level via TVC. In this manner, the control torque TC generated by the RCS can be reduced to zero in a reasonable interval and the RCS propellant is conserved since it is expended at a high rate only for short spans of time. In addition, the line of action of the engine is maintained in a constant direction throughout this operation. To achieve this, a small counterclockwise rotation of the vehicle is obtained by making TC slightly greater in magnitude than TD during this operation.

Figure 4:
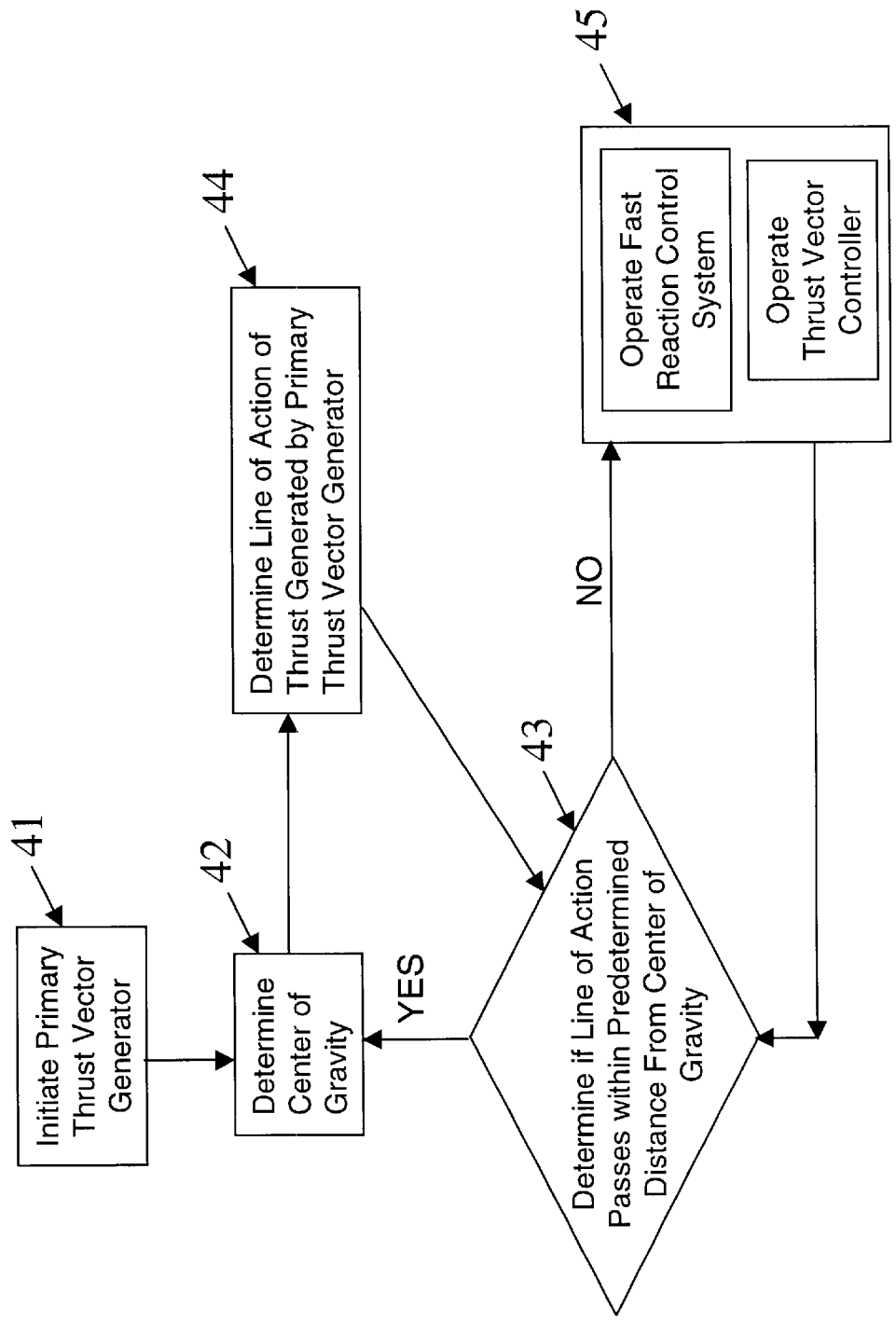
FIG. 4 is a method flow chart using the invention shown in FIG. 3

Referring now to FIG. 4 there is shown a method flow chart using the invention shown in FIG. 3. The primary thrust generator 41 is initiated to generate the primary thrust vector. The next steps determine 42 the center of gravity of the body and the line of action, step 44. The line of action is then analyzed 43 for intersection with the body's center of gravity. If the LOA passes within a predetermined distance from the body's center of gravity the process is repeated by again determining 42 the body's center of gravity and the LOA 44. If the LOA does not pass through the center of gravity the complementary reaction control system RCS and the thrust vector controller TVC are operated 45 until the LOA passes through the body's center of gravity.

In this manner, the advantageous complementary action of a fast acting mass expulsion RCS with a low complexity TVC offers a simple and low-cost alternative to high-performance TVC systems, and to RCS systems with excessive propellant requirements.

Figure 7:
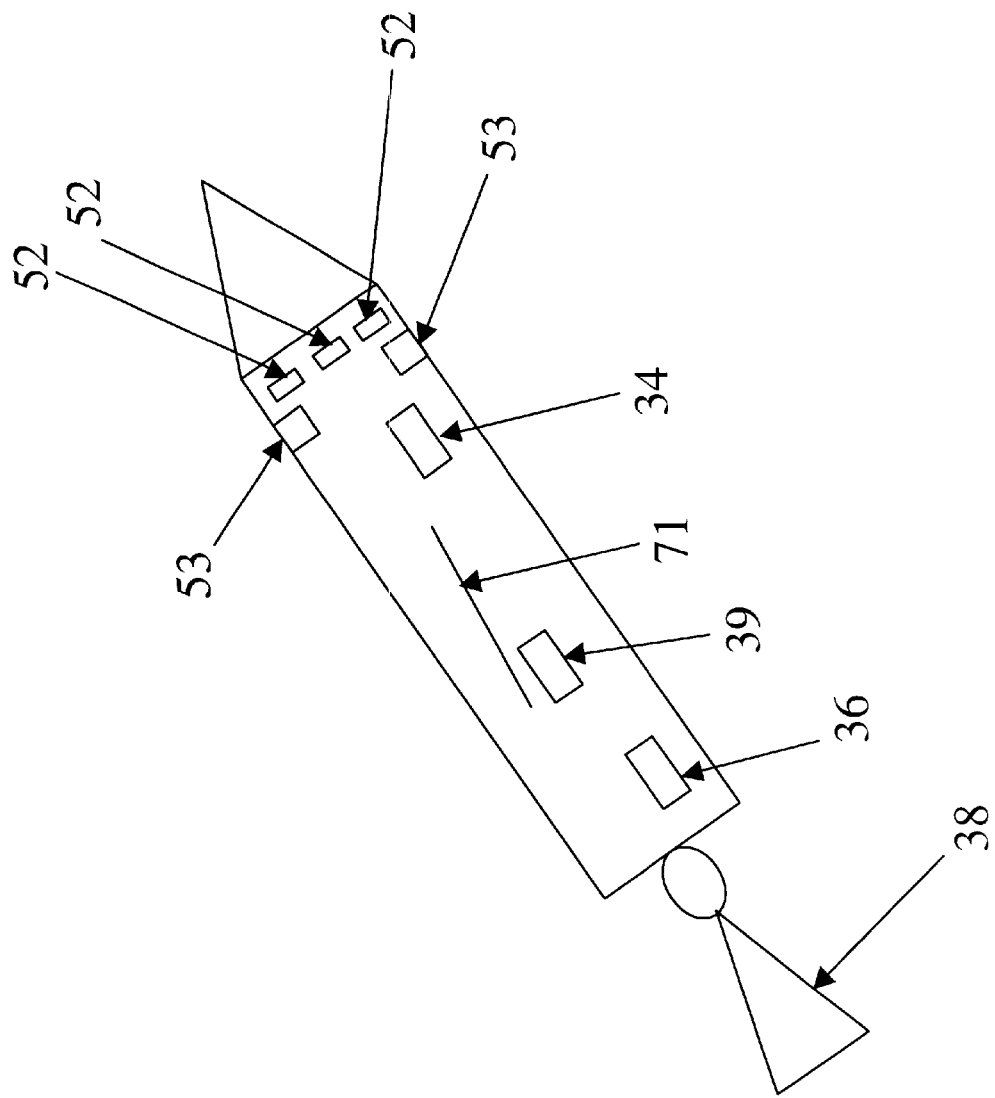
FIG. 7 is a pictorial view of a body incorporating features of an alternate embodiment of the invention.

Referring also to FIG. 7, in an alternate embodiment the RCS may comprise a combination of radial thrusters 52 and/or tangential thrusters 53 and at least one aerodynamic vane item 71. The radial thrusters are then operated in synchronicity with the aerodynamic vane 71 in order to produce the corrective thrust.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A system for controlling attitude about pitch, yaw, and roll axes and axial thrust of a body, the system comprising:
    a main thrust generator, the main thrust generator located on an aft portion of the body, the aft portion of the body being aft of a dynamic center of gravity of the body, wherein the main thrust generator produces the axial thrust;
    a thrust vector controller (TVC) connected to the main thrust generator;
    at least one reaction control system (RCS), the at least one RCS located on a forward portion of the body, the forward portion of the body being forward of the dynamic center of gravity of the body; and
    at least one RCS controller connected to the at least one RCS and the TVC.

2. A system as in claim 1, wherein the main thrust generator comprises at least one mass expulsion device.

3. A system as in claim 2, wherein the at least one mass expulsion device comprises a propellant, wherein the propellant is selected from the group consisting of liquid propellant, solid propellant, steam and compressed gas.

4. A system as in claim 1, wherein the main thrust generator comprises hydrodynamic propulsion.

5. A system as in claim 1, wherein the TVC comprises a controller, wherein the controller is selected from the group consisting of: at least one electro-mechanical controller, at least one hydraulic controller, and at least one electro-mechanical controller and at least one hydraulic controller.

6. A system as in claim 1 wherein the at least one RCS comprises at least three radial thrusters, arranged in a pattern around the body, wherein each of the at least three radial thrusters are arranged to selectively produce a radial thrust vector, wherein each radial thrust vector is perpendicular to an axial thrust vector.

7. A system as in claim 6 wherein the pattern around the body comprises a circumferential pattern.

8. A system as in claim 6 wherein the pattern around the body comprises a staggered pattern around the body periphery such that at least one of the at least three radial thrusters does not lie in the same plane as either one of the other two radial thrusters.

9. A system as in claim 6 wherein the at least three radial thrusters each comprise a first mass expulsion device.

10. A system as in claim 6 wherein the at least one RCS further comprises:
    at least two tangential thrusters, the at least two tangential thrusters are arranged to selectively produce a tangential thrust vector, wherein the tangential thrust vector is tangential to the axial thrust to control rotation of the vehicle around the axial thrust vector.

11. A system as in claim 10 wherein the at least two tangential thrusters, each further comprise at least one mass expulsion device.

12. The system of claim 1 wherein the thrust vector controller operates synchronously with the at least one reaction control system.

13. The system of claim 1 wherein the at least one reaction control system is combined with the thrust vector controller.

14. The system of claim 13 wherein the combined at least one reaction control system and thrust vector controller provides simultaneous attitude control of torque applied by the main thrust generator and a rotation of the main thrust generator thrusting subsystem.

15. The system of claim 1 wherein the at least one reaction control system responds to signals with a relatively fast band pass to control short-term dynamic disturbance and the thrust vector controller is adapted to reposition an engine thrust vector.

16. The system of claim 1 wherein the thrust vector controller eliminates principal rocket attitude disturbance.

17. The system of claim 1 wherein the thrust vector controller controls slow dynamical motions and the at least one reaction control system controls rapid dynamical motions.

18. An attitude control system for controlling momentum vector force about a center of gravity of a rocket, the rocket having a central axis, the system comprising:
    a main propulsion nozzle having a main propulsion axis, the main propulsion nozzle disposed aft of the center of gravity;
    a main chamber providing a propelling gas to said main propulsion nozzle;
    a reaction control system, wherein the reaction control system is disposed forward of the center of gravity, wherein the reaction control system comprises a plurality of radial nozzles, wherein the plurality of radial nozzles are selectively and independently controlled;
    at least aerodynamic vane, the at least one aerodynamic vane having a leading edge, wherein the leading edge is positioned in the direction of travel; and
    a synchronizer for controlling an angle of attack of the at least one controllable aerodynamic vane and the plurality of radial nozzles.

19. An attitude control system as in claim 18, wherein the propelling gas is generated by gas generating means for generating said propelling gas selected from the group consisting of liquid propellant, solid propellant, steam and compressed gas.

20. An attitude control system as in claim 18, wherein the plurality of radial nozzles are symmetrically arranged around the periphery of the body in a common plane, wherein the common plane is at a right angle to the central axis.

21. The apparatus as set forth in claim 18, wherein the plurality of radial nozzles are arranged in non-common planes around the periphery of the body, wherein the non-common planes are at right angles to the central axis.

22. The apparatus as set forth in claim 18, wherein the plurality of radial nozzles are mounted flush with an outer surface of the body.

23. The apparatus as set forth in claim 18, wherein the plurality of radial nozzles comprises at least two straight radial nozzles.

24. The apparatus as set forth in claim 23, wherein the plurality of radial nozzles further comprises at least one tangentially canted radial nozzle, wherein the force generated by the at least one tangentially canted radial nozzle is orthogonal with respect to the central axis.

25. A rocket controller, the rocket controller disposed within a rocket, the rocket having forward and aft sections, a central axis, and a dynamic center of gravity, wherein the rocket controller comprises:

at least one first thrust generator, wherein the at least one first thrust generator is located aft of the dynamic center of gravity;

at least one first thrust vector controller, wherein the at least one first thrust vector controller controls the at least one first thrust generator;

at least one second thrust generator, wherein the at least one second thrust generator is located forward of the dynamic center of gravity; and at least one second thrust vector controller, wherein the at least one second thrust vector controls the at least one second thrust generator.

26. A rocket controller as in claim 25 wherein the at least one second thrust vector controller is synchronized with the at least one first thrust vector controller.

27. A rocket controller as in claim 25, wherein the at least one first thrust generator comprises thrust propelling gas, wherein the thrust propelling gas is generated by gas generating means for generating said propelling gas selected from the group consisting of liquid propellant, solid propellant, steam and compressed gas.

28. A rocket controller as in claim 25, wherein the at least one second thrust generator comprises thrust propelling gas, wherein the thrust propelling gas is generated by gas generating means for generating said propelling gas selected from the group consisting of liquid propellant, solid propellant, steam and compressed gas.

29. A rocket controller as in claim 25, wherein the at least one second thrust generator comprises a plurality of radial nozzles, wherein the plurality of radial nozzles are symmetrically arranged around the rocket periphery in a common plane, wherein the common plane is at a right angle to the central axis.

30. A method for synchronizing forward and aft thrust vector control for a body traveling in a fluid, the body for minimizing fluid resistance and having forward and aft sections, primary thrust generator disposed in the aft section, and a secondary thrust generator disposed in the forward section, the method comprising the steps of:

initiating the primary thrust generator;

calculating a dynamic center of gravity for the traveling body;

calculating a principal thrust axis generated by the primary thrust generator;

determining an offset between the principal thrust axis and the dynamic center of gravity; and adjusting the offset to a predetermined value.

31. A method as in claim 30 wherein the step of adjusting the offset to the predetermined value further comprises the steps of:

calculating a torque required to adjust the offset to the predetermined value;

initiating the secondary thrust generator to apply the calculated torque; and steering the primary thrust generator to adjust the offset to the predetermined value.

32. A method as in claim 30 wherein the step of initiating the secondary thrust generator further comprises the step of adjusting a duty cycle of the secondary thrust generator.

33. A program storage device readable by a machine, tangibly embodying a program of instructions executable by the machine to perform method steps for synchronizing forward and aft thrust vector control for a body traveling in a fluid, the body for minimizing fluid resistance and having forward and aft sections, a primary thrust generator disposed in the aft section, and a secondary thrust generator disposed in the forward section, said method steps comprising:

initiating the primary thrust generator;

calculating a dynamic center of gravity for the traveling body;

calculating a principal thrust axis generated by the primary thrust generator;

determining an offset between the principal thrust axis and the dynamic center of gravity; and adjusting the offset to a predetermined value, wherein the step of adjusting the offset further comprises the steps of:

calculating a torque required to adjust the offset to the predetermined value;

initiating the secondary thrust generator to apply the calculated torque; and steering the primary thrust generator to adjust the offset to the predetermined value.

* * * * *